United States Patent [19]

Charmat

[11] Patent Number: 4,460,608
[45] Date of Patent: Jul. 17, 1984

[54] SEPARATION OF ACCUMULATED DEPOSITS FROM ALCOHOLIC BEVERAGES BY FREEZING

[76] Inventor: Robert Charmat, 12, Rue des Marronniers, 75016 Paris, France

[21] Appl. No.: 326,579

[22] Filed: Dec. 2, 1981

[51] Int. Cl.$^3$ .......................... C12G 1/06; C12G 3/02
[52] U.S. Cl. ........................................ 426/11; 99/277; 99/277.1; 426/15; 426/490; 426/495; 426/524
[58] Field of Search .................. 426/11, 15, 524, 490, 426/495; 99/277.1, 277

[56] References Cited

U.S. PATENT DOCUMENTS

| | | | |
|---|---|---|---|
| 1,759,578 | 5/1930 | Kelso | 99/455 X |
| 1,768,263 | 6/1930 | Marshall | 99/453 X |
| 2,181,839 | 11/1939 | Tressler | 426/15 |
| 2,536,993 | 1/1951 | Cremaschi | 426/15 |
| 2,536,994 | 1/1951 | Cremaschi | 426/15 |
| 2,610,123 | 9/1952 | Bruyere et al. | 426/15 |
| 3,404,006 | 10/1968 | Malick | 426/15 |

FOREIGN PATENT DOCUMENTS 2450872  11/1980  France ................................. 426/15

*Primary Examiner*—David M. Naff
*Attorney, Agent, or Firm*—Darby & Darby

[57] ABSTRACT

A process and vat are disclosed for removing impurity deposits such as fermentation residues, lees and crystallized potassium bitartrate in the preparation of alcoholic beverages such as sparkling wines. After fermentation in a closed standing up vat, fermented liquid containing deposited impurities in the bottom portion of the vat is frozen with a freezing means within the bottom portion of the vat and unfrozen liquid above the frozen liquid is withdrawn. Depositing of impurities in the bottom portion of the vat prior to freezing can be accelerated by cooling the liquid in the vat without freezing so that cooling starts at the top of the vat and progresses towards the bottom.

6 Claims, 2 Drawing Figures

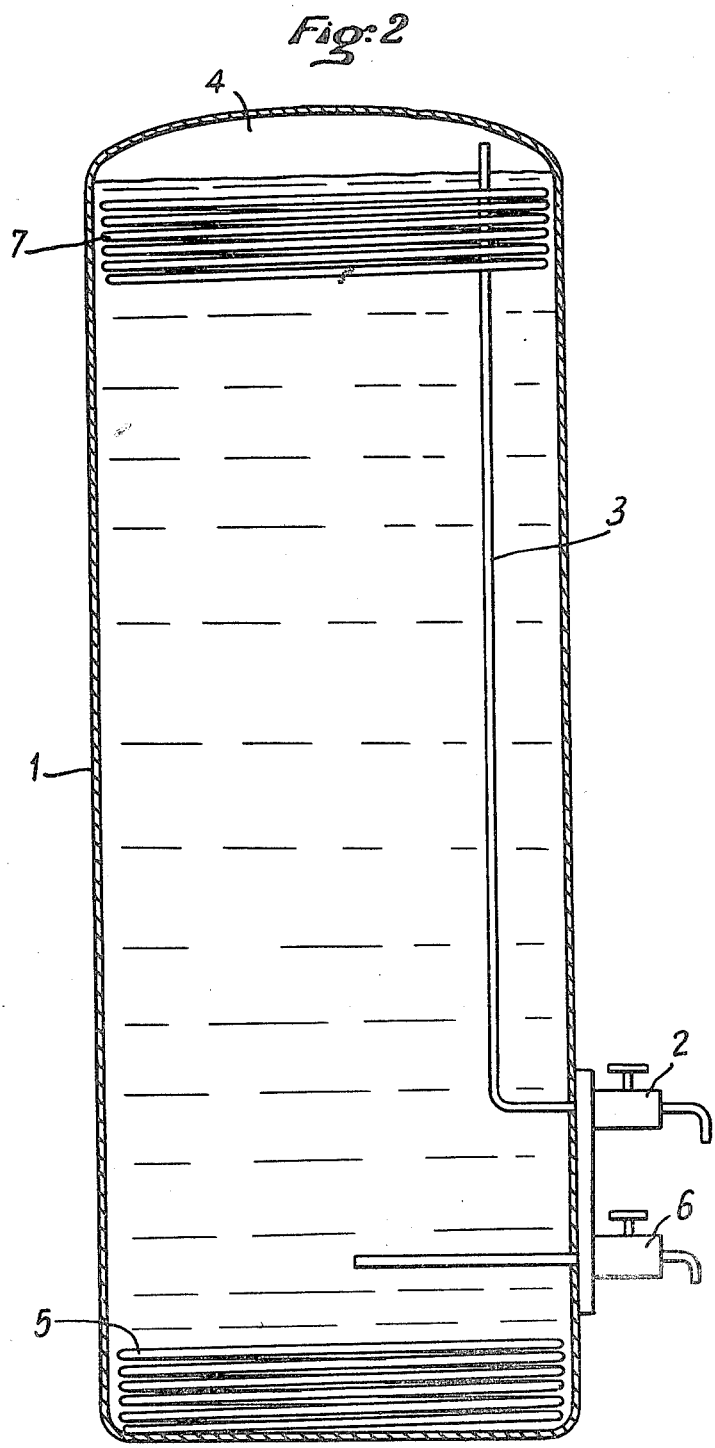

SEPARATION OF ACCUMULATED DEPOSITS FROM ALCOHOLIC BEVERAGES BY FREEZING

FIELD OF THE INVENTION

The present invention relates to a new method for making alcoholic drinks.

Although particularly advantageous for making sparkling wines, the method is also applicable to the manufacture of all types of drinks which have to be subjected to a fermentation and a decanting, such as wines, still or not, ciders, etc.

BACKGROUND OF THE INVENTION

One of the critical operations of the manufacturing methods of fermented drinks is the separation of the fermentation residues. For so doing, several methods are presently used, which are all specific to the types of drinks to which they are applied.

The racking off consists in pouring the clear portion of the liquid from a vat to another, the operation being repeated, when fine wines are involved, until complete elimination of the lees. It can be carried out in air (young wines) or sheltered from air (old wines).

The filtration is carried out during the transfer from the fermentation vat to the storing vat. It requires complex and costly installations, not only as regards investment but also maintenance, and it subjects the wine to a violent treatment which is prejudicial to its quality.

With respect to sparkling wines in particular, two methods are presently used.

The first is the traditional method, also called natural "champa-gnization" method. The foam build-up occurs while the wine is bottled. In order to eliminate the yeasts and fermentation residues, the deposits have to be worked down onto the corks of the bottles and the sediment-coated corks have to be extracted. For facilitating said extraction, the bottles are dipped in a refrigerant brine in order to capture the deposits accumulated on the cork in an ice block more easy to expel.

The champagnization method can be little mechanized, and with difficulty as, it requires a specialized personnel and large installation. Therefore, it is used only for making costly and high quality wines.

The second method is called closed vat fermentation. The foam build-up occurs in a large capacity closed vat, then the wine is transferred into a racking off vat, after having been filtered, in order to be bottled.

In order to maintain during the whole treatment a constant pressure balance, the whole installation, including the filtration installation, has to be isobarometric.

Because of the disadvantages due to the filtration, said second method has been used only for making industrially sparkling wines of ordinary quality.

OBJECT AND SUMMARY OF THE INVENTION

The object of the present invention is the manufacture in closed vats of alcoholic drinks having a quality equivalent to the drinks obtained by the so-called natural methods.

According to the invention, the wine is put in a closed vat for fermentation, and after fermentation and decanting, the vat bottom is frozen up, that is the lower portion of the liquid in which are all the accumulated deposits (yeasts, fermentation residues, lees, crystallized potassium bitartrate, etc.). Thus, the wine can be racked off without filtration and without running the risk of making it cloudy due to the deposits being set back in suspension.

In the particular case of sparkling wines or effervescent fermented drinks, such as ciders, such a freezing is carried out after foam build-up. It provides the possibility of avoiding the working of the deposit down onto the cork and the extraction of the sediment-coated cork of the champagnization method.

The invention relates also to a closed vat for carrying out the hereabove method, characterized in that it comprises in its lower portion a freezing device.

According to another aspect of the method of the invention, in order to speed up the decanting process after fermentation and/or foam build-up, the liquid is cooled down by starting from the top of the vat while maintaining a difference sufficient for avoiding freezing.

For obtaining such a refrigeration, the vat according to the invention comprises in its top portion appropriate refrigerant means.

BRIEF DESCRIPTION OF THE DRAWINGS

Further features and advantages of the invention will become more apparent from the following description, with reference to the appended drawings wherein:

FIG. 2 shows schematically a vat similar to that of FIG. 1 but having in addition refrigerant means in its top portion.

DETAILED DESCRIPTION OF THE EMBODIMENTS

Figure 1:
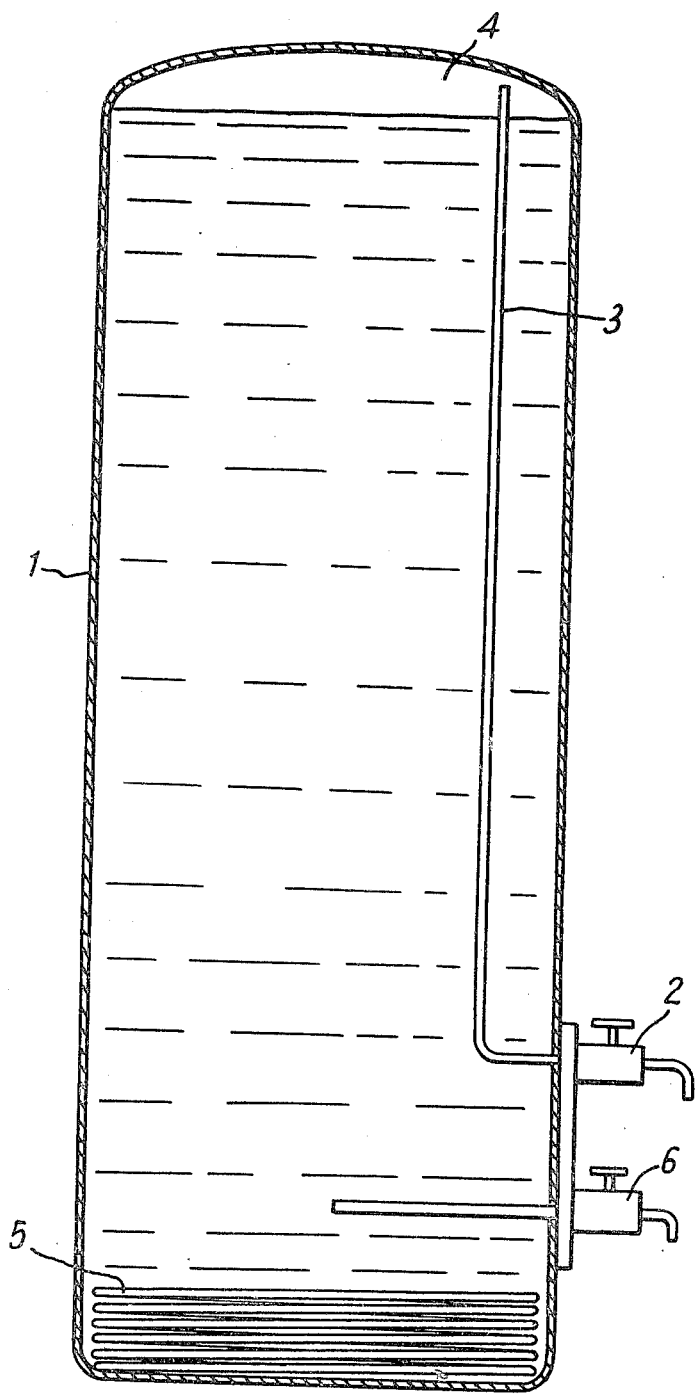
FIG. 1 shows schematically a vat provided in its bottom portion with freezing means.

The vat 1 shown in FIG. 1 is a closed vat of known type. It comprises filling means and a level gauge, not shown. In addition, it comprises a fermentation control device made of a valve 2, connected to a carbonic acid compressor, not shown, and a cannula 3 placed inside the vat, the free end of which reaches the free space 4 provided at the top portion of the vat when filling it up.

At the bottom of the vat is placed a refrigerant coil of tubing 5 connected to control means and to a compressor, not shown. Preferably, said refrigerant device has a capacity sufficient for freezing about 5% of the liquid contained in the vat. The frozen portion will then occupy approximately 1/20th of the height of the vat.

Slightly above the maximum freezing level is placed a racking device 6 which, when sparkling wines are being manufactured, is an isobarometric racking device of known type.

The method according to the invention is carried out, with the assistance of the hereabove described vat, in the following manner:

In the case of still wines, the vat is filled up while leaving a free space for the control and balance of the inner pressure of the vat during fermentation by means of valve 2.

Eventually, the wine can be sugared.

During fermentation, the fermentation residues settle and accumulate at the bottom of the vat.

When the fermentation is completed, the freezing device is started until solidifation of the lower portion of the vat (bottom) containing such deposits. The non frozen portion can then be racked off without filtration, since the residues trapped inside the ice cannot be set back in suspension in the vat.

Thereby are avoided violent treatments which are responsible for the bad quality of the wine produced so far in closed vats.

When the vat is empty, the frozen portion has only to be warmed up and racked off in order to clean the vat.

In the case of effervescent drinks, particularly sparkling wines, yeasts are added when filling up the vat, which bring about the foam build-up during fermentation. It is desirable to keep such yeasts which remain active and can be used again for the following vatfuls.

The invention provides the advantage of allowing reusing immediately the vat bottom containing the yeasts which are freed when filling up the vat because the frozen portion melts.

According to an advantageous feature of the invention, the decanting is speeded up by using the properties of cold to propagate downwards. To this effect, when the fermentation is completed and before the vat bottom freezes up, the liquid contained in the vat is refrigerated by starting from the top.

Cold propagation speeds up the decanting of the fermentation residues and causes crystallization of the potassium bitartrate which it is particularly required to eliminate, notably for white wines.

Said refrigerating operation is controlled so that the liquid does not reach its freezing point. It is stopped before carrying out the freezing up of the vat bottom.

A device used for obtaining such a refrigeration is shown schematically in FIG. 2. In the top portion of vat 1 is placed a coil of tubing 7 also connected to a compressor equipped with a thermostat, not shown.

Advantageously, a single compressor can be used both for the freezing up and the refrigeration coils of tubing.

I claim:

1. A method of producing alcoholic beverages comprising in sequence the steps of:

(a) fermenting a fermentable liquid in a closed standing up vat having a top portion and bottom portion;

(b) accelerating deposition of impurities contained in said fermenting liquid at the bottom of said vat, by a step consisting essentially of refrigerating said liquid without freezing it with a refrigerating means located at the top portion of the vat, said refrigeration commencing at the top of said vat and progressing towards the bottom of said vat, thereby taking advantage of the downwards direction of cold propagation, said cold propagation speeding up decantation, crystallization and accumulation of said impurities at the bottom of the vat, and (c) removing said deposited impurities by directly freezing the portion of said liquid located at the bottom of said vat with a freezing means located within the bottom portion of said vat to contain said impurities in the bottom portion of the vat and drawing off the unfrozen portion from above the frozen portion of said liquid to obtain said alcoholic beverage.

2. A method of claim 1, wherein said step (b) is conducted by refrigerating means located solely at the top portion of said vat.

3. The method of claim 1, wherein said alcoholic beverage is an effervescent beverage and wherein step (c) is preceded by a step of building up foam within said vat.

4. The method of claim 3, wherein about five percent of the liquid contained in said vat is frozen during said step (c).

5. The method of claim 1, wherein said refrigeration process is terminated prior to commencement of said step (c).

6. The method of claim 2, wherein said refrigeration process is terminated prior to commencement of said step (c).

* * * * *